United States Patent
Courville et al.

[11] Patent Number: 5,966,433
[45] Date of Patent: Oct. 12, 1999

[54] METHOD AND APPARATUS FOR SCREENING CALLS IN TELEPHONE NETWORKS

[75] Inventors: Bernard Courville, Pierrefonds; Gilles Trepanier, Aylmer; Ron Kelly, Greely, all of Canada; Luc Samson, Immenstaad; Michel Tougas, Friedrichshafen, both of Germany

[73] Assignees: Nortel Networks Corporation, Montreal, Canada; Bell Canada, Montreal, Canada; Stentor Resource Centre Inc., Ottawa, Canada

[21] Appl. No.: 08/601,608

[22] Filed: Feb. 14, 1996

Related U.S. Application Data

[60] Provisional application No. 60/007,818, Nov. 30, 1995.

[51] Int. Cl.$^6$ .............................. H04M 3/42; H04M 7/00
[52] U.S. Cl. ........................... 379/201; 379/207; 379/219
[58] Field of Search .................................. 379/201, 207, 379/210, 211, 220, 188, 200, 219, 221, 230

[56] References Cited

U.S. PATENT DOCUMENTS

| | | | |
|---|---|---|---|
| 4,757,267 | 7/1988 | Riskin | 379/219 |
| 4,791,665 | 12/1988 | Bogart et al. | 379/207 |
| 5,157,719 | 10/1992 | Waldman | 379/356 |
| 5,222,125 | 6/1993 | Creswell et al. | 379/67 |
| 5,276,731 | 1/1994 | Arbel et al. | 379/88 |
| 5,327,486 | 7/1994 | Wolff et al. | 379/96 |
| 5,515,427 | 5/1996 | Carlsen et al. | 379/201 |
| 5,533,107 | 7/1996 | Irwin et al. | 379/201 |
| 5,550,910 | 8/1996 | DeJager | 379/201 |
| 5,696,816 | 12/1997 | Sonnenberg | 379/220 |

*Primary Examiner*—Harry S. Hong
*Assistant Examiner*—Benny Q. Tieu
*Attorney, Agent, or Firm*—Thomas Adams

[57] ABSTRACT

A telephone network comprises at least one switching unit having a plurality of subscriber access lines each having an associated calling number and, a storage device storing a plurality of listings of destination numbers. Each listing is associated with a respective one of the calling numbers and defines defining a personalized local calling area for that particular calling number. The switching unit detects a destination number dialed by a caller setting up a call, accesses the personalized local calling area listing for that calling number, and compares the detected destination number with the selected listing to determine whether the call is local or long distance. Each of the listings may comprise numbers having between three and ten digits. Provision may be made for the subscriber to create the personalized calling area by adding entries to, or deleting entries from, a standard local calling area common to a group of subscribers. The storage device may comprise central storage storing a plurality of listings for each of a plurality of switches in the network, and local storage associated with each of the switches for storing the plurality of listings for that particular switch.

23 Claims, 5 Drawing Sheets

1ST STEP: LCA SCREENING

2ND STEP: PLCA SCREENING (NEW)

| KEY AREA CODE | OFC CODE | STN CODE | ENABLED | PROVNAME | LOCALNUM | LOCALSET | LOCALGRP | TOLLNUM | TOLLSET | TOLLGRP |
|---|---|---|---|---|---|---|---|---|---|---|
| 613 | 821 | 1234 | Y | BELL | (613692 819621) | (12345) | (OTTAWA) | (6137745) | (56789) | (HULL) |

FIG. 6A

| PROVNAME | SERVICE | ENABLED | USAGEBIL | CARRIER | CHARGEDN | SERVICE | PROVDN | PLCAAMA |
|---|---|---|---|---|---|---|---|---|
| BELL | PLCA | Y | BILLSP | BEL1 | 6136210000 | PLCA | 6136211234 | Y |
| ABCD | PLCA | N | BILLSP | UNT1 | 8196230000 | PLCA | 8196231040 | N |
| PRIMARY | PLCA | Y | SUPPRESS | - | - | PLCA | 6136215678 | Y |

METHOD AND APPARATUS FOR SCREENING CALLS IN TELEPHONE NETWORKS

This application claims benefit of Provisional Application Ser. No. 60/007,818 filed Nov. 30, 1995.

BACKGROUND OF THE INVENTION

1. Technical Field

The invention relates to a method and apparatus for screening calls in telecommunications networks and, in particular, for determining whether or not a call to a particular destination is a local call.

2. Background Art

It is usual for subscribers in a particular area to be able to make "local" calls to destinations within a Local Calling Area without incurring toll charges or for lower rates than more distant destinations. When dialling a destination number which is outside the Local Calling Area, the subscriber usually must dial the digit "1", perhaps followed by a three-digit area code, before dialling the seven-digit destination number. The central office equipment screens the dialed digits to determine whether the call is a local call or a long-distance/toll call.

In modern, stored-program central office switches, such call screening usually is performed by software which accesses a table listing 3- to 6-digit numbers determining destination numbers to which, for all subscribers in that particular area, calls will constitute local calls. The extent of the Local Calling Area is determined by the telephone company. A particular subscriber may frequently make calls to locations which are outside the Local Calling Area yet closer geographically than some locations which are within the Local Calling Area. Because they are outside the Local Calling Area, however, they incur toll charges. This can be a source of annoyance to the subscriber.

Some telephone companies may extend the Local Calling Area to include one or more additional exchanges, providing a majority of subscribers approve of the extension and agree to pay the higher basic local rates to compensate for the toll charges which otherwise would have been charged. Unfortunately, if a majority do not approve, those subscribers who did approve do not receive the extended service.

SUMMARY OF THE INVENTION

The present invention seeks to mitigate these disadvantages.

Thus, according to one aspect of the invention, a telephone network having provision for local call screening using personalized local calling areas comprises a plurality of switching units, each of the switching units having a plurality of access lines for an associated plurality of subscribers, storage means storing a plurality of profiles, each profile being associated with a respective one of the subscribers and comprising data defining an individual local calling area personal to that particular subscriber and call screening means comprising detector means for detecting a subscriber identifier and a destination number dialed by a subscriber setting up a call, selection means for accessing the storage means and selecting the profile corresponding to the detected subscriber identifier, and comparator means for comparing at least some digits of the detected destination number with numbers defined by the selected profile and determining the call to be local or long distance in dependence upon such comparison.

In this specification, the term "profile" refers to data, typically in a table, which defines an individual local calling area for a particular subscriber.

The subscriber identifier may conveniently be the calling number of the corresponding access line.

In preferred embodiments, the network further comprises a database unit remote from, and accessible by, each of the switching units. The database unit comprises storage means storing, for each of the switching units, a said plurality of profiles, means for communicating with callers via the switching units and enabling a caller to determine content of the profile associated with a particular subscriber identifier, and means for transferring to each of the switching units copies of the plurality of profiles for that switching unit, each profile copy identified with the corresponding subscriber. Each switching unit may then having means for substituting such copy profile for any existing profile stored for that subscriber identifier.

In preferred embodiments, the database unit has means for identifying the switching unit with which the subscriber is associated and restricting the selection to numbers previously determined to be available to said plurality of subscribers associated with that switching unit. The database unit may have means for transferring a copy of the profile from the database unit to the switching units via an operation, administration, maintenance and provisioning network.

Each of the profiles may comprise numbers having between three and ten digits. The comparing means may compare most significant digits first. Typically, for North America, limiting cases would be three digits identifying numbering plan areas (NPAs) and ten digits identifying individual directory numbers (DNs).

Each profile may include one or more set identifiers each identifying a selected one of a plurality of predefined sets of three to ten digit numbers, such sets being available to all of the plurality of subscribers. The profile may also include one or more group identifiers each identifying a selected one of a plurality of groups of such sets.

Thus, the database unit may store data identifying, for each switching unit, a plurality of predefined sets of said numbers available to subscribers associated with that switching unit. The storage means at the switching unit may then store said plurality of predefined sets of numbers, the communicating means be arranged to enable the subscriber to make a selection from said plurality of predefined sets of numbers, and the means for transferring be arranged to incorporate the selection of sets in the profile for transfer to the switching unit.

Where the plurality of predefined sets comprises at least one group of predefined sets with a group identifier, the means for communicating with the subscriber may then be arranged to enable the subscriber to select said group by selecting said group identifier, and the means for transferring be arranged to incorporate the selection of groups in the profile for transfer to the switching unit.

According to a second aspect of the invention, there is provided a method of personalized local call screening in a telephone network, the network comprising a plurality of switching units, each of the switching units having a plurality of access lines for an associated plurality of subscribers and storage means for a plurality of profiles, each profile being associated with a respective one of the subscribers and comprising data defining an individual local calling area personal to that particular subscriber, the method comprising the steps of monitoring the access lines and detecting a subscriber identifier and a destination number dialed by the subscriber setting up a call, in dependence upon the subscriber identifier, accessing the personal profile of that subscriber, comparing at least some of the digits of the detected destination number with the numbers defined by the profile, and determining the call to be local or long distance in dependence upon such comparison.

Where the network comprises database means remote from the switching units and storing, for each of the switching units, a said plurality of profiles, the subscriber may establish the content of the personalized local calling area by accessing the database unit and selecting numbers for inclusion in the profile for that subscriber. The database unit will then transfer a copy of the profile to the corresponding switching unit, which will store the profile for use in screening subsequent calls by that subscriber.

Preferably, a voice activated response system or other menu-driven interactive computer program for conversing with the subscriber is used when the subscriber is defining the profile.

Various, features, objects and advantages of the present invention will become apparent from the following description, taken in conjunction with the accompanying drawings, of a preferred embodiment which is described by way of example only.

BRIEF DESCRIPTION OF DRAWINGS

FIGS. 6A and 6B illustrate data-filled tables used by the call screening procedure.

DESCRIPTION OF THE PREFERRED EMBODIMENT

Figure 1:
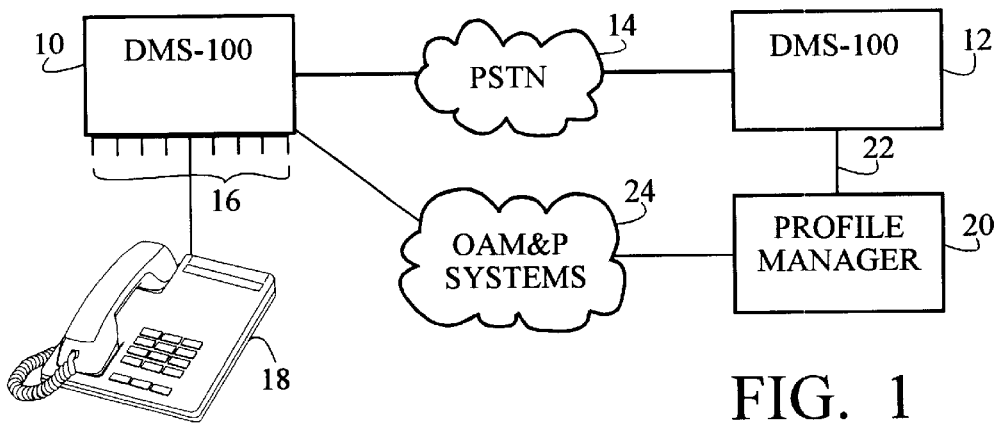
FIG. 1 illustrates a portion of a telephone network showing components involved in implementing Personalized Local Calling Areas.

FIG. 1 illustrates a portion of a telephone network comprising a plurality of interconnected switching units. For simplicity of illustration, FIG. 1 shows only two central office switching units 10 and 12, for example DMS-100 (Trademark) stored program switches manufactured by Northern Telecom Limited, interconnected by the public switched telephone network (PSTN) as indicated at 14. Multiple access lines 16 connect subscribers to switch 10, the station apparatus of one subscriber 18 being illustrated, by way of example, by a telephone set.

A profile manager 20 is shown connected to switch 12 by line 22 and to switch 10 by way of the standard operations, administration, maintenance and provisioning system (OAM&P) as indicated at 24. The profile manager 20 is a software entity residing in a database unit, for example, at a central location, such as an operations centre of the network. The profile manager 20 communicates, by way of the PSTN 14, with subscribers accessing it via switch 10 and downloads their current profiles to switch 10 via the OAM & P systems 24.

In modern telephone systems, the service provider will make available various optional services, known as "features", which a subscriber may obtain by specifically requesting and paying for them. Typically the software and data for providing the features are stored in a data store at each central office switch or, in the case of Advanced Intelligent Networks, stored at a remote location and queried by the switch as required. The facility to establish a Personalized Local Calling Area (PLCA) will be provided to subscriber 18 as such a "feature". In order to provide the service, the switch will store "profiles" for those of its subscribers who subscribe to PLCA.

The profile manager 20 stores such PLCA profiles for subscribers throughout the network who subscribe to a Personalized Local Calling Area feature and has software enabling the subscribers to create and/or update their profiles. Each subscriber's profile includes a listing of individual destination numbers, sets of destination numbers and groups of such sets of destination numbers which are selected by the subscriber. Typically, the subscriber will create the Personalized Local Calling Area by modifying the standard local calling area listing, in particular by adding or deleting individual umbers or groups of numbers having the same area code or exchange. The result is illustrated in FIG. 3, the original standard local calling area being referenced 26A and the Personalized Local Calling Area being referenced 26B.

Figure 3:
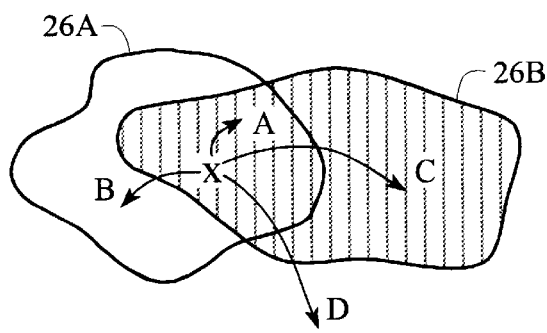
FIG. 3 illustrates differences between a Standard Local Calling Area and a Personalized Local Calling Area.

For the subscriber, represented as X in FIG. 3, destinations A which were within the Standard Local Calling Area 26A and are in the Personalized Local Calling area 26B are still treated as local calls. Destination numbers C are numbers which previously were toll or long distance calls but now are within the personalized local calling area and hence are local calls. Destinations B are numbers which previously were local i.e. were in the original local calling area 26A, but are now long distance calls because they were deleted by the subscriber. Destinations D are outside both the original local calling area and the personalized local calling area and so remain as long distance calls.

Figure 4:
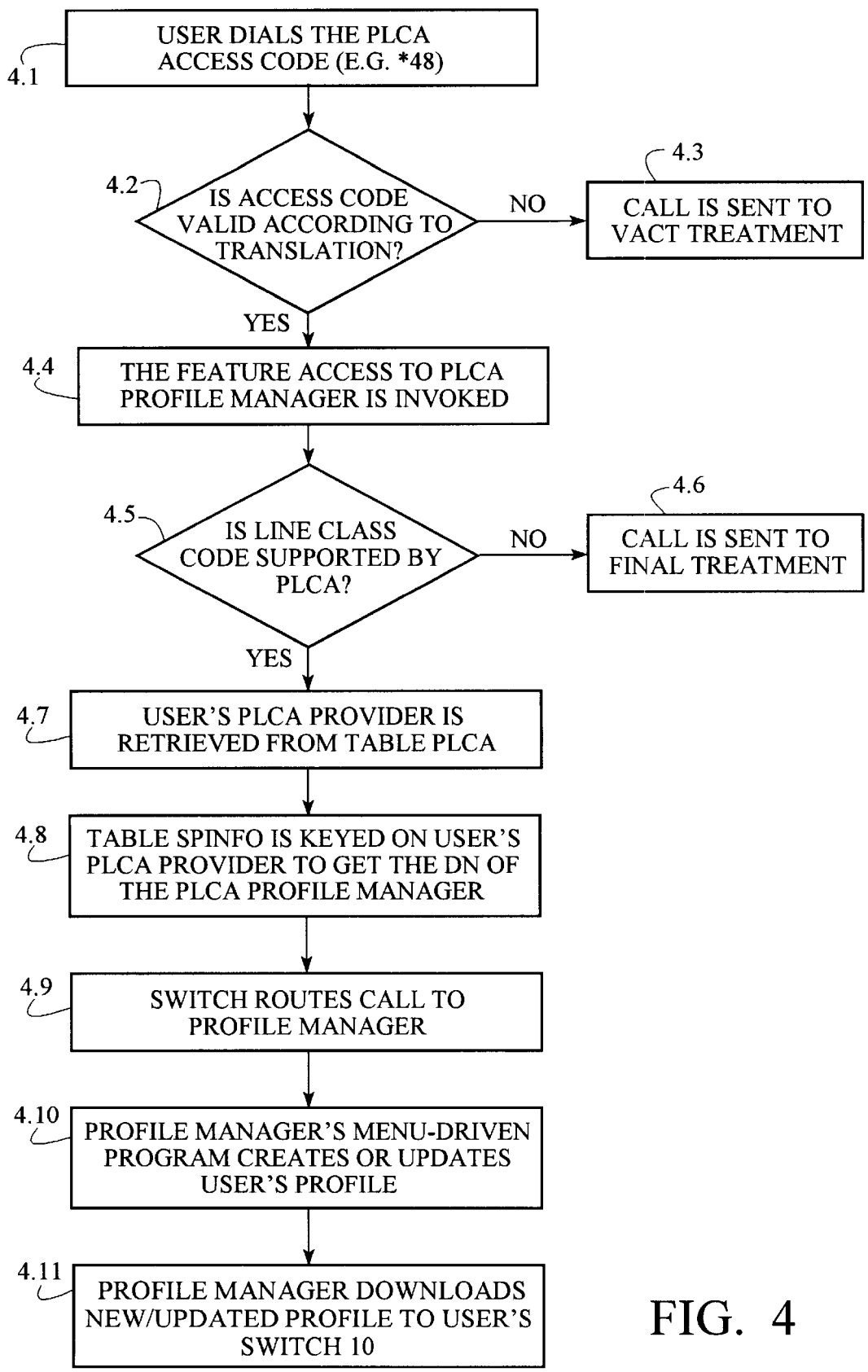
FIG. 4 is a flow chart illustrating the setting up of a call for a caller having a Personalized Local Calling Area.

The subscriber X may set up or modify a Personalized Local Calling Area by accessing the profile manager 20 using a feature "Access to PLCA Profile Manager". As illustrated in FIG. 4, immediately after going "off-hook", the subscriber dials an access code, for example "*48", as in step 4.1. In step 4.2, the switch 10 performs a standard validity check upon the access code, as translated. If it is not valid, step 4.3 routes the call for "vacant" (VACT) treatment which will generate a suitable announcement or tone for transmission to the subscriber. If the access code is valid, step 4.4 invokes the feature Access to PLCA Profile Manager, whereupon the feature program checks, in step 4.5, that the Line Class Code of the subscriber's line is supported by the PLCA feature. If it is not, step 4.7 sends the call to Feature Not Allowed (FNAL) treatment.

If the check is positive, in step 4.7, the PLCA feature retrieves the subscriber's PLCA provider from table PLCA (FIG. 2B) which is stored at switch 10 as part of the subscriber's profile and, in step 4.8, looks up the table SPINFO in the subscriber's profile to retrieve the PLCA provider's destination number and related information to route the call to the provider's profile manager 20. If table SPINFO has no PLCA provider for the subscriber, because the subscriber has not selected a provider previously, the feature may prompt the subscriber to select a provider from a list; or select a PRIMARY PLCA provider from table SPINFO by default. Reverse translation is used to determine the destination number to be dialled to reach the provider's profile manager 20 and, in step 4.9, the switch 10 routes the call to the profile manager 20 via the PSTN 14 and switch 12.

On receipt of the call, in step 4.10, the profile manager 20 invokes a menu-driven routine or "interactive voice response" system, which advises the caller about options, prices, and so on, and prompts the caller to give information as to the destination number, and/or groups and sets of destination numbers to be added to, or deleted from, the subscriber's profile. The additions and deletions are made with reference to a standard local calling area, i.e. common to all of the subscribers at that switch.

When prompted, the subscriber makes selections to build table PLCA by selecting entries from table PLCASET and/or table PLCAGRP. Table PLCA lists individual 3- to 10-digit destination numbers and identifiers for entries in table PLCASET and table PLCAGRP. Table PLCASET lists sets of 3- to 10-digit destination numbers. For example, one set might be the numbers beginning (514) 696 22 and the numbers beginning (514) 765. Each set may have a name, for example a district name, enabling the subscriber to select such a set from a list of names of districts to add all of the numbers of the set to his profile. Table PLCAGRP contains groups of such sets. For example, a group might be all of the various exchanges which comprise Greater Montreal and which, for convenience, can be invoked by the subscriber selecting the group rather than by selecting every exchange within the group individually. Hence, the subscriber might select "Montreal" to add all of the numbers in the group to his profile.

When the additions and deletions have been made and the subscriber has terminated the call, in step 4.11, the profile manager 20 downloads the new/updated profile to the subscriber's switch 10 which substitutes it for the profile presently in its data store. The profile manager 20 may download the new/updated profile via the OAM&P system 24 or any other convenient way. The subscriber's Personalized Local Calling Area can then be used.

An example of one subscriber's entry in PLCA table is shown in FIG. 6A. There would be an entry for each subscriber. Beginning with the leftmost column, the entry specifies that:

6138211234 is the DN of the PLCA subscriber

Y indicates that PLCA is enabled on the subscriber's line

The service provider for this subscriber is BELL, whose particulars are data-filled in table SPINFO (see FIG. 6B)

The next three fields represent selections included in the subscriber's Personal Local Calling Area:

NPA–NXX codes 613692 and 819621 (to include DNs beginning with one of those numbers the PLCA set 12345 which is data-filled in table PLCASET (below)

the PLCA group OTTAWA which is data-filled in table PLCAGRP (below)

The last three fields represent the numbers explicitly excluded from the subscriber's Personal Local Calling Area, and are therefore considered toll:

the number 6137745 (to exclude DNs beginning with that number)

the PLCA set 56789 which is data-filled in table PLCASET the PLCA group HULL which is data-filled in table PLCAGRP The subscriber's profile in table PLCA uses references to groups or sets that are defined in the new tables PLCAGRP and PLCASET respectively. Sample entries for table PLCAGRP are as follows:

| KEY GRPNAME | SET |
|---|---|
| OTTAWA | (12571 14234) $ |
| HULL | (65210 65211) $ |
| MONTREAL | (51400 51401) $ |

The above entries specify that

OTTAWA, HULL and MONTREAL are the names of groups that can be selected by a particular group of subscribers and used in, or excluded from, their PLCA profiles.

12571 and 14234 are the two sets that make up the PLCA group OTTAWA.

65210 and 65211 are the two sets that make up the PLCA group HULL 51400 and 51401 are the two sets that make up the PLCA group MONTREAL.

Samples of the entries for table PLCASET are as follows:

| KEY SETID | COMMENT | NUMBER |
|---|---|---|
| 12345 | ORLEANS | 613830 |
| 12571 | OTTAWA1 | (6135** 61356**) $ |
| 14234 | OTTAWA2 | (613832 613823–5) $ |
| 56789 | GLOUCESTER | 613822 |
| 65210 | HULL1 | (81956) $ |
| 65210 | HULL2 | (81972) $ |
| 51400 | MONTREAL1 | (51427 51428) $ |
| 51401 | MONTREAL2 | (51487 51493) $ |

In the PLCASET, the entries in column KEY SETID are identifiers, each associated with a set of numbers; each of the entries in column COMMENT is a string providing information on the set; and each entry in column NUMBER is the list making up the set. For example:

12345 is the identifier associated with a first set of NUMBERs

ORLEANS is a string providing information on the set 613830 is the list making up the PLCA set 12345

12571 is the identifier associated with a second set of NUMBERs

OTTAWA1 is a string providing information on the set 613540 and 6135411 form the list making up the PLCA set 12571 and so on . . .

The provider's PLCA profile is data-filled in the new table SPINFO. FIG. 6B shows a sample entry in the table SPINFO for the PLCA feature as follows:

BELL and ABCD are the names of PLCA Providers. PRIMARY PLCA can be used when there is no PLCA provider data-filled in table PLCA.

The entries Y and N in field ENABLED specify the PLCA feature is respectively enabled for the provider BELL and disabled for provider ABCD.

USAGEBIL specifies to bill the service providers BELL and ABCD, if the call to that provider, i.e. when accessing the profile manager, is toll according to the subscriber's PLCA profile. SUPPRESS indicates that no billing records are generated for the PRIMARY provider.

BEL1 and UNT1 are preferred carriers for providers BELL and ABCD respectively, if the call to that provider is toll according to the subscriber's PLCA profile. (BEL1 and UNT1 are carrier names that are defined in a table OCCNAME which is not illustrated here)

6136210000 and 8196230000 are charge numbers against which calls are billed for providers BELL and ABCD respectively, if the call to that provider is toll according to the subscriber's PLCA profile.

6136211234 is the DN used to access BELL's PLCA Profile Manager while 8196231040 is for ABCD's Profile Manager. The actual DN for dialling is obtained through reverse translation based on the subscriber's dialling plan.

The entries Y and N in field PLCAAMA specify that specific PLCA module codes to AMA records generated on previously-toll and previously-local calls should respectively be appended for the provider BELL and not be appended for provider ABCD.

It should be noted that these names and numbers are for illustration only and do not necessarily correspond to those of the actual geographical locations.

It should be noted that numbers in fields LOCALNUM and TOLLNUM are selected by the subscriber and, although 6-digit numbers are shown in the example, 10-digit numbers may be selected, if desired. Moreover, although the subscriber may choose the particular sets entered into fields LOCALSET and TOLLSET; and may choose the particular groups entered into fields LOCALGRP and TOLLGRP, the 3-to 10-digit numbers which constitute the actual content of each set and each group will have been predefined by the telephone company and stored in the data store of switch 10. The profile manager 20 will store, or have access to, data identifying which predefined sets and groups are available to subscribers connected to a particular switch. During creation or updating of the subscriber's profile, the profile manage will use the calling number to determine what sets and groups are available to the subscriber and will present only those sets and groups to the subscriber with an invitation to make a selection. The subscriber's selection is entered in the table PLCA.

It should be appreciated that these entries in tables PLCAGRP and PLCASET are abridged for simplicity.

Figure 2A:
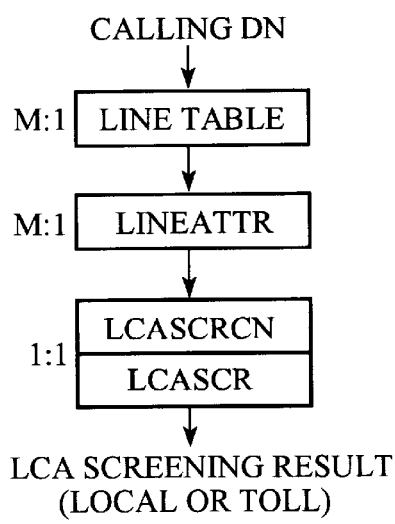
FIGS. 2A and 2B illustrate differences between Standard Local Calling Area screening and Personalized Local Calling Area screening.
Figure 2B:
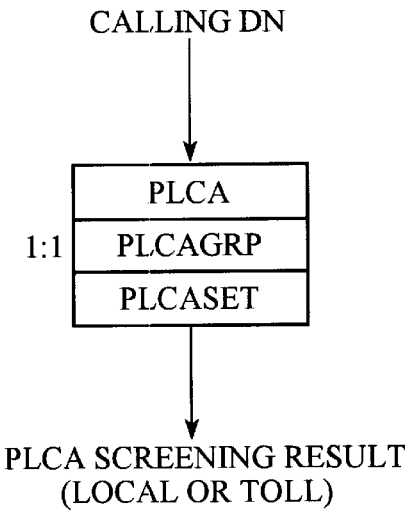
Figure 5A:
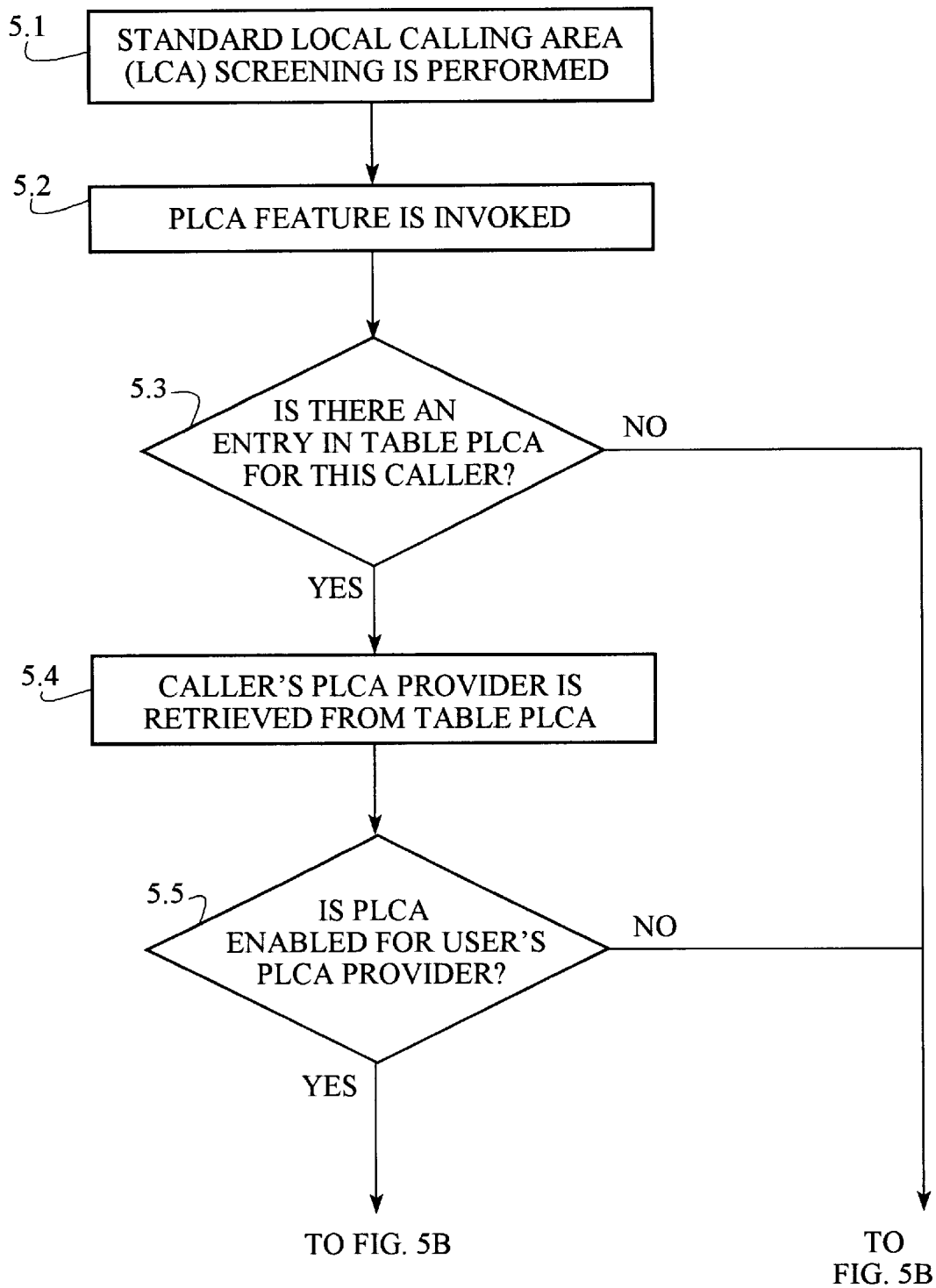
FIGS. 5 and 5B are a flowchart illustrating how a subscriber sets up or modifies a Personalized Local Calling Area.
Figure 5B:
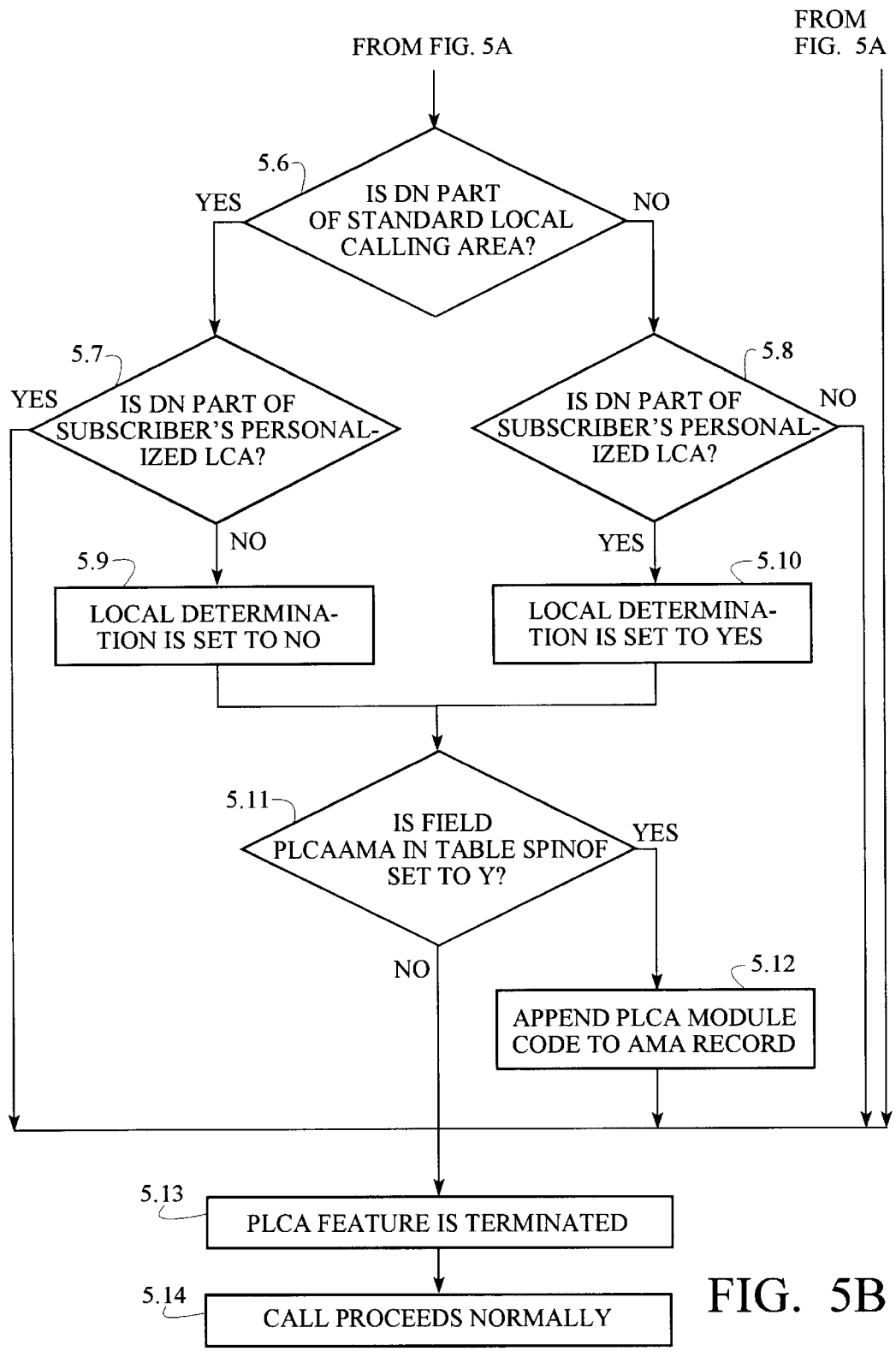

Referring to FIGS. 2A, 2B, 3 and 4, when subsequently the subscriber uses telephone 18 to dial a destination number (DN), the software within the switch performs standard local call screening to determine whether the call is a local call or not. As illustrated by step 5.1 in FIG. 5, Standard Local Calling Area screening is performed first. This entails accessing a LINE TABLE (see FIG. 2), in dependence upon the type of the originating line. From the LINE TABLE, a key is found to the line attributes table LINEATTR. As indicated in FIG. 2A, the correspondence between the calling number and this key is M:1, i.e. a relatively large set of calling DNs may have the same key in table LINEATTR. From this point, the screening result is obtained on the basis of this set of calling numbers and not for a specific calling number. Hence, the result will be the same for all of the set of calling numbers.

From the LINEATTR table, a key to table LCASCRCN is found. Again, the correspondence is M:1 since many tuples in the LINEATTR table can reference the same LCASCRCN tuple. From table LCASCRCN, only one screening result LCASCRN will be found for the called destination number. Hence, the correspondence is 1:1. A limitation of Standard Local Calling Area screening is that the patterns are limited by the implementation to a maximum of six digits, i.e. NPA–NXX (NPA is numbering plan area; NXX is the exchange). Individual 10-digit destination numbers are not identifiable.

It should be noted that, where the same called DN is dialled from a set of calling numbers, the Standard Local Calling Area screening process always ends up with the same LCASCRCN tuple, so that the screening result is always the same.

Standard Local Calling Area screening is performed for all calling destination numbers because its results are used by various applications, such as basic call processing, and because it is preferred that the Personalized Local Calling Area be created by amending the standard local calling area. Otherwise it would be necessary to have a relatively large body of data defining the personalized local calling area for every individual subscriber. Regardless of which application or feature invokes the Local Calling Area screening procedure, the Personalized Local Calling Area screening will have precedence over the standard local calling area screening to determine whether or not the call is a "local" call or a "toll" call.

Once Standard Local Calling Area screening has been done, step 5.2 invokes the Personalized Local Calling Area screening feature, whereupon decision step 5.3 checks that there is an entry in table PLCA (see FIG. 2B) for the subscriber. This entry is that made when the subscriber's profile in profile manager 20 (FIG. 1) has been set up with the subscriber's Personalized Local Calling Area, as described above. If decision step 5.3 indicates that there is no entry in table PLCA for the subscriber, the program goes to step 5.13 and terminates the PLCA feature, following which the call proceeds as in step 5.14.

If there is an entry in table PLCA, however, step 5.4 retrieves the identity of the caller's PLCA provider from table PLCA. It should be appreciated that, in this particular example, the telephone company providing the basic call connection service is not necessarily the same as the company which provides the PLCA feature, and perhaps other services.

In decision step 5.5, the program checks for a flag inside the subscriber's table to determine whether or not PLCA has been enabled for the PLCA provider identified in step 5.4. If the result of decision step 5.5 is negative, the program once again goes to step 5.13 and terminates the PLCA feature.

If PLCA has been "enabled" for that service provider, the result of decision step 5.5 is positive, and decision step 5.6 determines whether or not the dialled destination number is within the Standard Local Calling Area, as determined in step 5.1. If the destination number is within Standard Local Calling Area 26A, decision step 5.7 determines whether or not the dialled destination number is within the caller's Personalized Local Calling Area 26B. Such determination entails using the caller's number to retrieve the caller's Personalized Local Calling Area profile from the data store which, in this example, is at the switch 10 but which, in an Advanced Intelligent Network, for example, might be at a remote location.

Since the listing of numbers in the subscriber's profiles is customized for each subscriber, the screening result is specific to the caller's destination number.

It will be appreciated that, where the PLCA feature is provided only by the telephone company providing basic connection services, step 5.4 and 5.5 could be omitted.

Results of the PLCA screening will now be described for each of the calls illustrated in FIG. 3.

DIALLED DESTINATION A

If decision step 5.7 indicates that the dialled destination number is also within the caller's Personalized Local Calling Area, i.e. to destination A of FIG. 3, step 5.13 terminates the PCLA feature and the call proceeds as a "normal" local call.

DIALLED DESTINATION B

If decision step 5.7 indicates that the dialled destination number is not within the caller's Personalized Local Calling Area 2B, step 5.9 sets to "NO" a Local Determination flag in the call attributes information. This is despite the fact that decision step 5.6 indicated that the dialled DN was within the Standard Local Calling Area. This situation corresponds to a destination number B in FIG. 3 which was previously "local" but now is long distance.

DIALLED DESTINATION D

If decision step 5.6 indicates that the dialled destination number is outside the Standard Local Calling Area 26A, decision step 5.8 (using the same procedure as step 5.7) determines whether the dialled destination number is within the caller's Personalized Local Calling Area 26B. If it is not, the call was, and still is, a long distance call, corresponding to destination D of FIG. 3. Step 5.13 terminates the PLCA feature and the call proceeds as a toll call.

DIALLED DESTINATION C

If decision step 5.8 indicates that the dialled destination number is within the caller's Personalized Local Calling Area 26B, step 5.10 set the Local Determination flag to "YES", indicating that, whereas the destination was previously long distance, now it is a local call, corresponding to destination C of FIG. 3.

Where the called destination number is one which has been added to or deleted from the standard local calling area to create the PLCA, i.e. as determined by step 5.9 or 5.10, the program accesses a service provider information table SPINFO and determines, in step 5.11, whether a field PLCAAMA in that table SPINFO is set to "YES", indicating that for this service provider a PLCA module is to be appended to Automatic Message Accounting (AMA) records generated on previously-local and previously-toll calls. Hence, if the field PLCAAMA is set to "YES", step 5.12 appends a PLCA module code to the AMA record to permit usage analysis, following which the PLCA feature is terminated by step 5.13 as before. If the PLCAAMA field is set to "NO", step 5.13 terminates the PLCA feature and the call proceeds.

Various modifications and substitutions may be made to the above-described embodiment within the scope of the present invention. For example, instead of a profile manager equipped with interactive voice response software to interact with the subscriber and set up or modify the subscriber's PLCA profile, it would be possible to have a human operator interact with the subscriber, make the required entries in the subscriber's profile, and copy the updated profile to the appropriate switch.

In the preferred embodiment, the profiles are stored and updated at a central profile manager. It would be possible, however, to make provision for a subscriber to update the subscriber's profile stored at the switch. Moreover, although, for purpose of illustration, only one profile manager 20 is shown in FIG. 1, it is likely that there will be one profile manager for each service provider, though this does not preclude several service providers sharing a profile manager.

Although FIG. 3 shows the Standard Local Calling Area 26A and Personalized Local Calling Area 26B as overlapping and with non-overlapping parts contiguous this does not represent a geographical relationship where the added destination numbers are within adjacent districts. It should be appreciated that PLCA could add not only parts of geographically-adjacent calling areas but also distant destination numbers or areas. For example, a subscriber in Ottawa might add frequently-called destination numbers in Montreal, if regulations permit.

The database unit may be arranged to prevent subscriber deleting certain individual numbers, such as 911 or other emergency numbers, or adding certain individual numbers, such as numbers which involve special fees, for example, 1-600 or 976 (in North America).

It should be noted that, whereas Standard Local Calling Area screening is limited to a maximum of six digits, i.e. the pattern NPA-NXX, Personalized Local Calling Area screening advantageously uses any pattern of 3 digits or more. For a particular numbering plan, for example North America, up to ten digits might suffice. For international calls, however, more than ten digits might be required.

Another advantage of embodiments of the present invention is that, once a previously-toll destination number has been added to the subscriber's personalized Local Calling Area, the subscriber no longer needs to dial the digit "1 " and the area code but need only dial the seven-digit destination number or, in some areas, ten-digit destination number.

Although, in the above-described embodiment, the storage means associated with each switching unit is local to that switching unit, it could be remote from the switch and accessed by it as required, such as in an Advanced Intelligent Network.

What is claimed is:

1. A method of local call screening in a telephone network, the network comprising a plurality of switching units, each or the switching units having a plurality of access lines for an associated plurality of subscribers and storage means for a plurality of profiles, each profile being associated with a respective one of the subscribers and comprising data defining a personal local calling area the content of which personal local calling area has been predetermined by that particular subscribers the method comprising the steps of monitoring the access lines and detecting a subscriber identifier and a destination number dialled by the subscriber setting up a call, in dependence upon the subscriber identifier, accessing the personal profile of that subscriber, comparing at least some of the digits of the detected destination number with said data and determining the call to be local or long distance in dependence upon such comparison.

2. A method as claimed in claim 1, in a said network further comprising database means linked to each of the switching units and having a store storing, for each of the switching units, a said plurality of profiles, wherein the content of the personalized local calling area is established by the prior step by the subscriber of accessing the database unit and selecting numbers for inclusion in the profile for that subscriber, the database unit transferring a copy of the profile to the corresponding switching unit and at the switching unit, storing the profile for use in screening subsequent calls by that subscriber.

3. A method as claimed in claim 2, the database unit storing a said plurality of profiles for each of the plurality of switching units, the method further comprising the step of, at the database unit, identifying the switching unit with which the subscriber is associated, and restricting the selection to numbers previously determined to be available to said plurality of subscribers associated with that switching unit.

4. A method as claimed in claim 2, the database unit being at a location remote from the switching unit, the method step of transferring a copy of the profile from the database unit to the switching unit with which the subscriber is associated being effected via an operations, administration, maintenance and provisioning network.

5. A method as claimed in claim 1, wherein each of the profiles comprises numbers each having up to ten digits and the comparison step compares the digits of the detected destination number with the numbers defined by the selected profile sequentially beginning with the most significant digits.

6. A method as claimed in claim 2, wherein the selection step effectively adds numbers to, or deletes numbers from, a standard local calling area listing defining destination numbers available to all of said plurality of subscribers.

7. A method as claimed in claim 2, further comprising the prior steps of storing at the database unit data identifying, for each switching unit, a plurality of predefined sets of said numbers available to subscribers associated with that switching unit, and storing at the switching unit said plurality of predefined sets of numbers, wherein the step of communicating with the subscriber includes the step of enabling the subscriber to select sets from said plurality of predefined sets of numbers.

8. A method as claimed in claim 7, wherein at least some of the predefined sets are in a group identified by a group identifier and the subscriber is enabled to select the group of sets by selecting the group identifier.

9. A method as claimed in claim 7, wherein the profile numbers comprise one or more individual numbers having up to ten digits in addition to said sets.

10. A method as claimed in claim 1, wherein the profile numbers comprise up to ten digits.

11. A method as claimed in claim 1, wherein the profile numbers comprise at least three digits.

12. A telephone network having provision for local call screening using personal local calling areas, the network comprising
   a plurality of switching Units, each of the switching units having
      a plurality of access lines for Ad associated plurality of subscribers,
      storage means storing a plurality of profiles, each profile being associated with a respective one of the subscribers and comprising data defining a personal local calling area the content of which personal local calling area has been predetermined by that particular subscriber and call screening means comprising
         detector means for detecting a subscriber identifier and a destination number dialled by a subscriber setting up a call,
         selection means for accessing the storage mean, and selecting the profile corresponding to the detected subscriber identifier, and
         comparator means for comparing at least some digits of the detected destination number with said data and determining the call to be local or long distance in dependence upon such comparison.

13. A network as claimed in claim 12, further comprising a database unit accessible by each of the switching units, the database unit having
   a store storing, for each of the switching units, a said plurality of profiles,
   means for communicating with callers via the switching units and enabling a caller to determine content of the profile associated with a particular subscriber identifier, and
   means for transferring to each of the switching units copies of the plurality of profiles for that switching unit, each profile copy identified with the corresponding subscriber,
   each switching unit having means for substituting such copy profile for any existing profile stored for that subscriber identifier.

14. A network as claimed in claim 13, the database unit further comprising means for identifying the switching unit with which the subscriber is associated and restricting the selection to numbers previously determined to be available to said plurality of subscribers associated with that switching unit.

15. A network as claimed in claim 13, wherein the database unit is located at a location remote from the switching units, and the means for transferring a copy of the profile from the database unit to the switching units is arranged to effect the transfer via an operations, administration, maintenance and provisioning network.

16. A network as claimed in claim 12, wherein each of the profiles comprises numbers each having up to ten digits and the comparing means is arranged to compare the digits of the detected destination number with the numbers defamed by the selected profile sequentially beginning with the most significant digits.

17. A network as claimed in claim 12, wherein each of the profiles defines numbers to be added to, or deleted from, a standard local calling area listing defining destination numbers available to all of said plurality of subscribers.

18. A network as claimed in claim 12, wherein the store at the database means stores data identifying, for each switching unit, a plurality of predefined sets of said numbers available to subscribers associated with that switching unit, the storage means at the switching unit stores said plurality of predefined sets of numbers, the communicating means is arranged to enable the subscriber to make a selection from said plurality of predefined sets of numbers, and the means for transferring is arranged to incorporate the selection of sets in the profile for transfer to the switching unit.

19. A network as claimed in claim 18, wherein the plurality of predefined sets comprises at least one group of predefined sets with a group identifier and the means for communicating with the subscriber is arranged to enable the subscriber to select said group by selecting said group identifier.

20. A network as claimed in claim 18, wherein the storage means stores one or more individual numbers having up to ten digits in addition to said sets.

21. A network as claimed in claim 12, wherein said numbers in said profile comprise up to ten digits.

22. A network as claimed in claim 12, wherein said numbers comprise at least three digits.

23. A telephone network comprising:
   a plurality of switching units, each of the units having
      a plurality of access lines for an associated plurality of subscribers;
      storage means storing a plurality of profiles, each profile being associated with a respective one of the subscribers and comprising data defining an individual local calling area for that particular subscriber, said data comprising numbers having between three and ten digits; and call screening means comprising
         means for detecting a destination number dialled by a subscriber setting up a call and detecting a subscriber calling number;
         means for accessing the storage means and selecting the profile corresponding to the detected subscriber calling number, and
         means for comparing at least some of the digits of the detected destination number with the numbers defined by the selected profile, beginning with most significant digits, and, if said at least part of the destination number is found, determining the call to be a local call; the network further comprising database means accessible by each of the switching units and having a store storing, for each of the switching units, a said plurality of profiles, means for communicating with a caller and enabling the caller to determine content of the profile associated with a particular subscriber calling number, and means for transferring to each of the switching units copies of the profiles for the plurality of subscribers associated with that switching unit;

wherein the store at the database means stores data identifying, for each switching unit, a plurality of predefined sets of said numbers available to subscribers associated with that switching unit, the plurality of predefined sets comprising at least one group of predefined sets with an associated group identifier, the storage means at the switching unit stores said plurality of predefined sets of numbers, the communicating means is arranged to enable the subscriber to make said selection by selecting individual predefined sets or groups thereof, and the means for transferring is arranged to incorporate the selection of sets in the profile before transference of the copy to the switching unit.

* * * * *